US010715742B1

(12) United States Patent
Faroy

(10) Patent No.: US 10,715,742 B1
(45) Date of Patent: Jul. 14, 2020

(54) MODULAR SURVEILLANCE TOWER SYSTEM

(71) Applicant: Moises Faroy, Clearwater, FL (US)

(72) Inventor: Moises Faroy, Clearwater, FL (US)

(*) Notice: Subject to any disclaimer, the term of this patent is extended or adjusted under 35 U.S.C. 154(b) by 21 days.

(21) Appl. No.: 15/975,370

(22) Filed: May 9, 2018

Related U.S. Application Data

(60) Provisional application No. 62/529,245, filed on Jul. 6, 2017.

(51) Int. Cl.
*H04N 5/247* (2006.01)
*H04N 5/225* (2006.01)
*H04N 7/18* (2006.01)
*H04N 5/232* (2006.01)

(52) U.S. Cl.
CPC .......... *H04N 5/247* (2013.01); *H04N 5/2252* (2013.01); *H04N 7/181* (2013.01); *H04N 5/23203* (2013.01)

(58) Field of Classification Search
CPC ...... H04N 5/247; H04N 5/2252; H04N 7/181; H04N 5/23203
See application file for complete search history.

(56) References Cited

U.S. PATENT DOCUMENTS

2016/0165187 A1* 6/2016 Rasheed .............. G06K 9/3241
348/143

* cited by examiner

*Primary Examiner* — Nam D Pham

(57) ABSTRACT

A base in a tubular configuration has an upper end and a lower end. The base is positioned on a recipient surface to allow monitoring of a site. Each of a plurality of modules is in a tubular configuration to facilitate removable coupling together the plurality of modules. A plurality of digital components are located within the modules. A digital device adapted to control the system is located remote from the tower. A processor is operatively coupled between the digital device and the digital components for communicating there between.

1 Claim, 6 Drawing Sheets

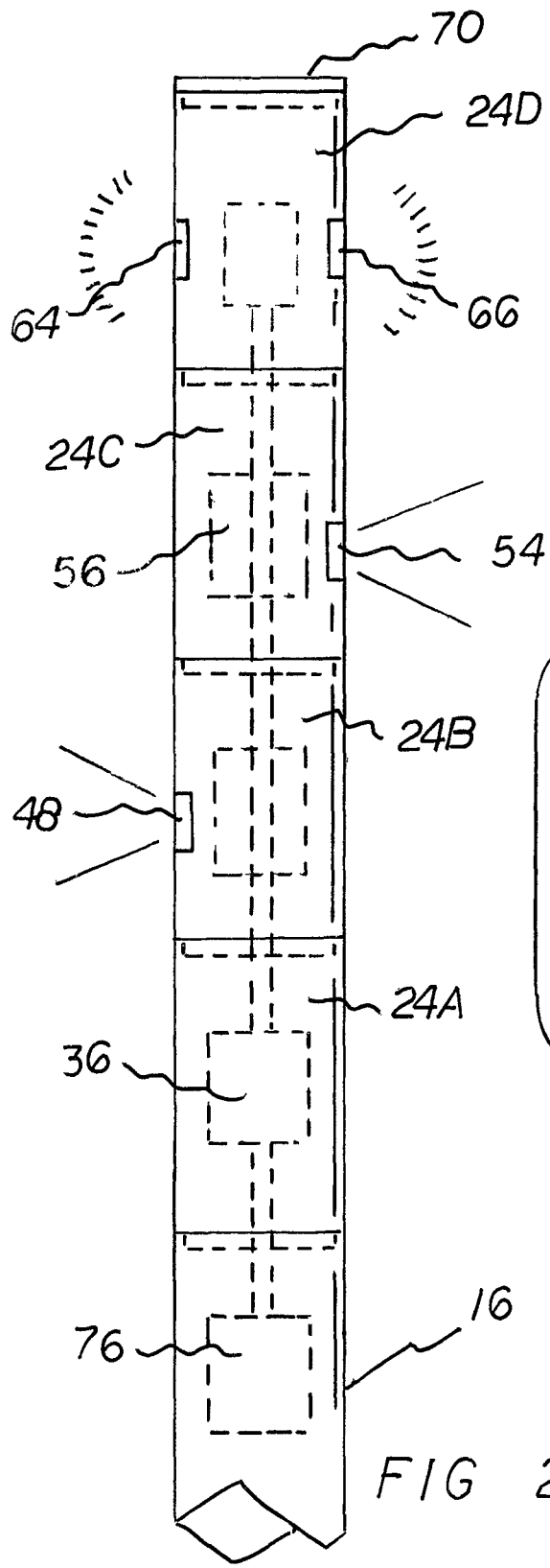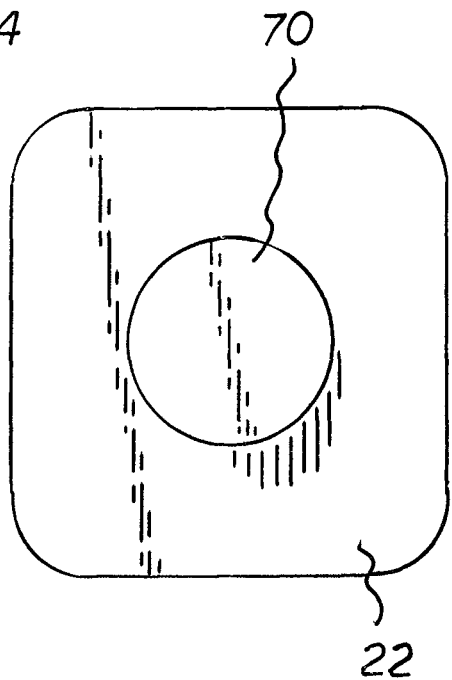

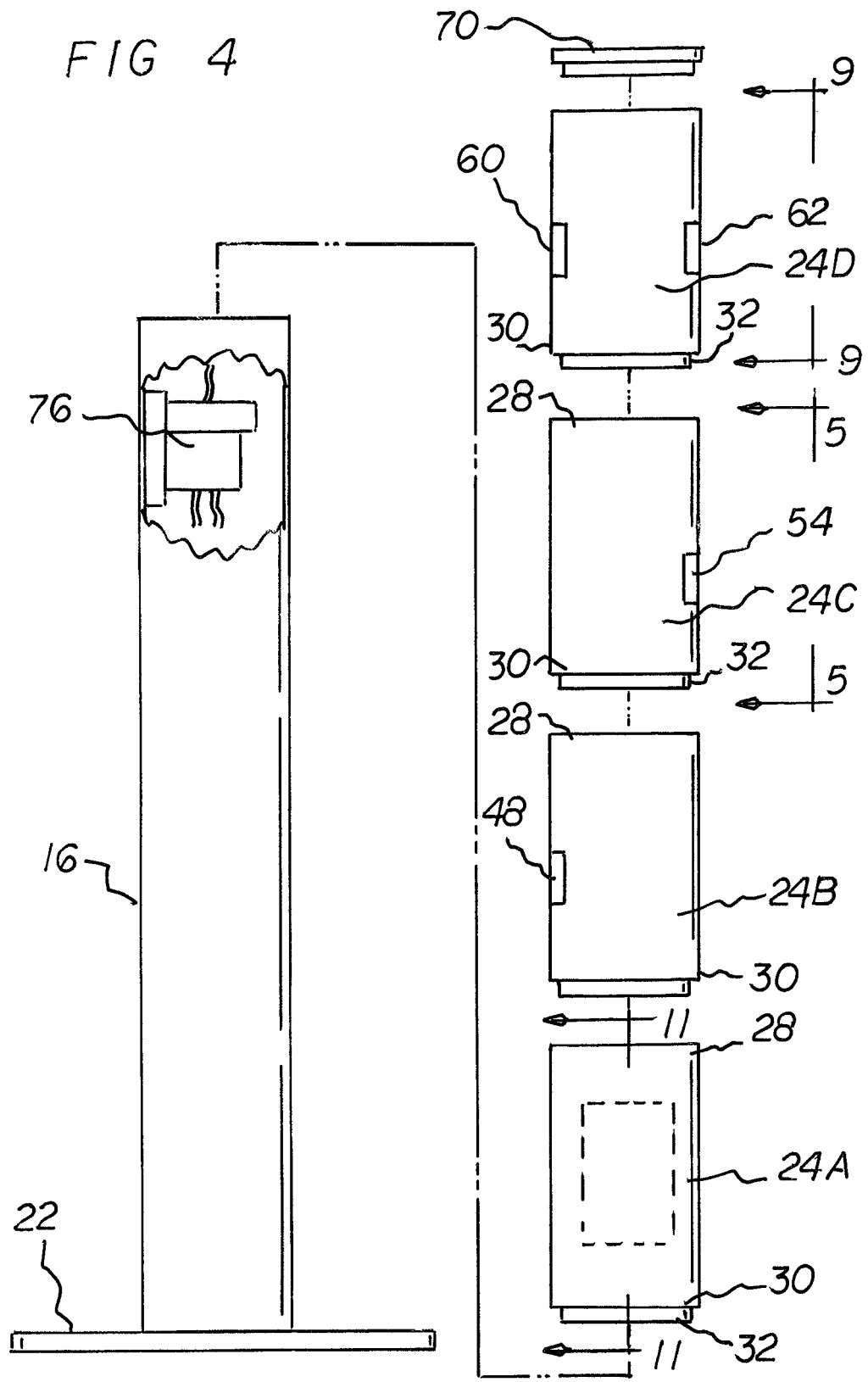

MODULAR SURVEILLANCE TOWER SYSTEM

RELATED APPLICATION

This non-provisional patent application is based upon and claims priority of Provisional Application No. 62/529,245 filed Jul. 6, 2017, the subject matter of which is incorporated herein by reference.

BACKGROUND OF THE INVENTION

Field of the Invention

The present invention relates to a modular surveillance tower system and more particularly pertains to monitoring a site and modifying the system as a function of changing conditions. The monitoring and the modifying are done in a safe, convenient, and economical manner.

Description of the Prior Art

The use of surveillance systems of known designs and configurations is known in the prior art. More specifically, surveillance systems of known designs and configurations previously devised and utilized for the purpose of monitoring sites are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a modular surveillance tower system that allows monitoring of a site and modifying the system as a function of changing conditions. The monitoring and the modifying are done in a safe, convenient, and economical manner.

In this respect, the modular surveillance tower system according to the present invention substantially departs from the conventional concepts and designs of the prior art, and in doing so provides an apparatus primarily developed for the purpose of monitoring a site and modifying the system as a function of changing conditions. The monitoring and the modifying are done in a safe, convenient, and economical manner.

Therefore, it can be appreciated that there exists a continuing need for a new and improved modular surveillance tower system which can be used for monitoring a site and modifying the system as a function of changing conditions. The monitoring and the modifying are done in a safe, convenient, and economical manner. In this regard, the present invention substantially fulfills this need.

SUMMARY OF THE INVENTION

In view of the disadvantages inherent in the known types of surveillance systems of known designs and configurations now present in the prior art, the present invention provides an improved modular surveillance tower system. As such, the general purpose of the present invention, which will be described subsequently in greater detail, is to provide a new and improved modular surveillance tower system and method which has all the advantages of the prior art and none of the disadvantages.

To attain this, from a broad perspective, first provided is a base in a tubular configuration and having an upper end and a lower end. The base is positioned on a recipient surface to allow monitoring of a site. Each of a plurality of modules is in a tubular configuration to facilitate removable coupling together the plurality of modules. A plurality of digital components are located within the modules. A digital device adapted to control the system is located remote from the tower. A processor is operatively coupled between the digital device and the digital components for communicating therebetween. Such components are individually configured and correlated with respect to each other so as to attain the desired objective.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

It is therefore an object of the present invention to provide a new and improved modular surveillance tower system which has all of the advantages of the prior art surveillance systems of known designs and configurations and none of the disadvantages.

It is another object of the present invention to provide a new and improved modular surveillance tower system which may be easily and efficiently manufactured and marketed.

It is a further object of the present invention to provide a new and improved modular surveillance tower system which is of durable and reliable constructions.

An even further object of the present invention is to provide a new and improved modular surveillance tower system which is susceptible of a low cost of manufacture with regard to both materials and labor, and which accordingly is then susceptible of low prices of sale to the consuming public, thereby making such modular surveillance tower system economically available to the buying public.

Lastly, it is an object of the present invention to provide a modular surveillance tower system for monitoring a site and modifying the system as a function of changing conditions. The monitoring and the modifying are done in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side elevational view of the system taken along line 2-2 of FIG. 1.

FIG. 3 is a plan view of the system taken along line 3-3 of FIG. 1.

FIG. 4 is an exploded side elevational view of the system shown in FIG. 1.

The same reference numerals refer to the same parts throughout the various Figures.

DESCRIPTION OF THE PREFERRED EMBODIMENT

Figure 1:
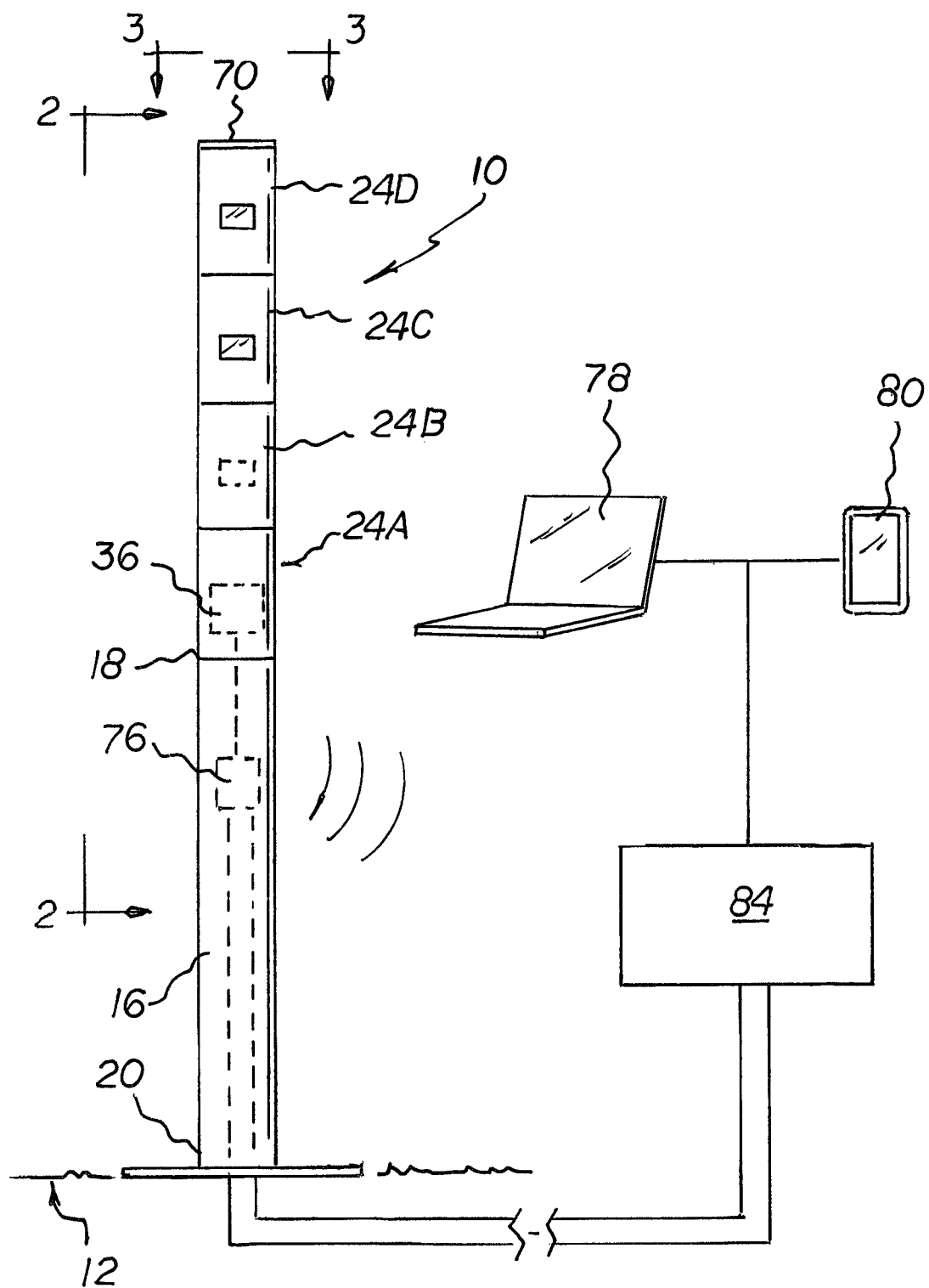
FIG. 1 is a front elevational view of a modular surveillance tower system constructed in accordance with the principles of the present invention.
Figure 5:
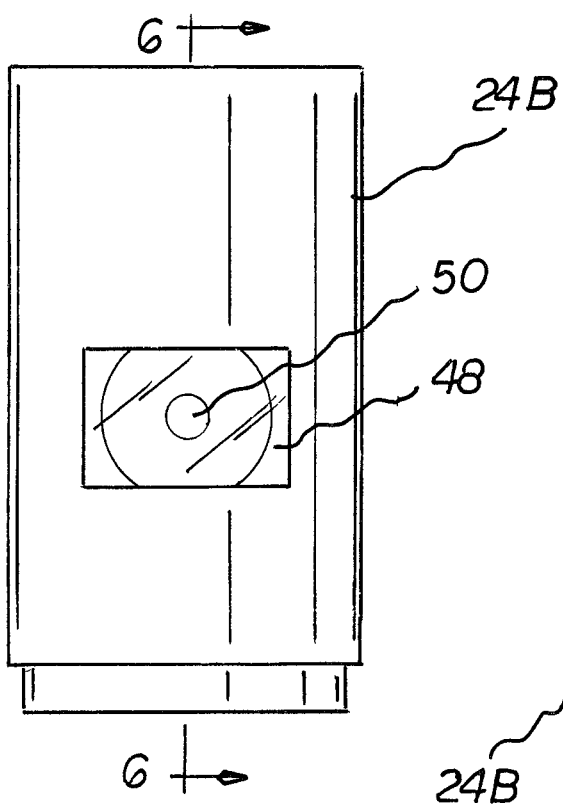
FIG. 5 is a side elevational view taken along line 5-5 of FIG. 4.
Figure 6:
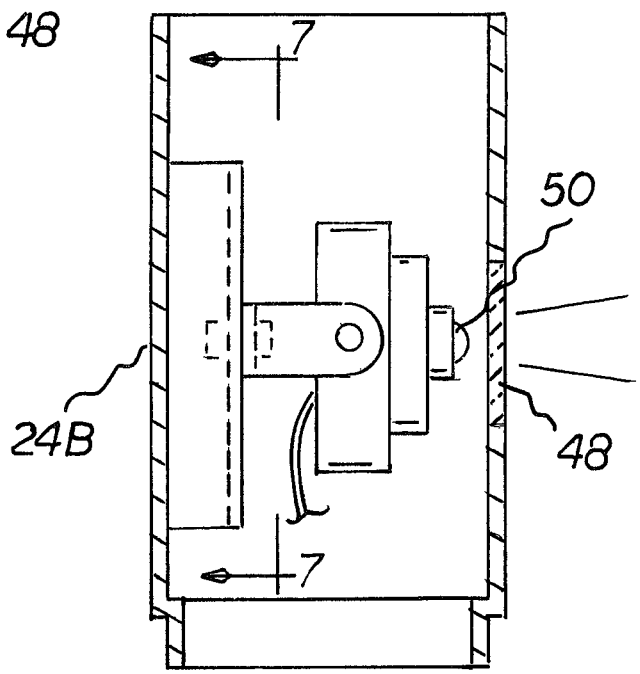
FIG. 6 is a cross sectional view taken along line 6-6 of FIG. 5.
Figure 7:
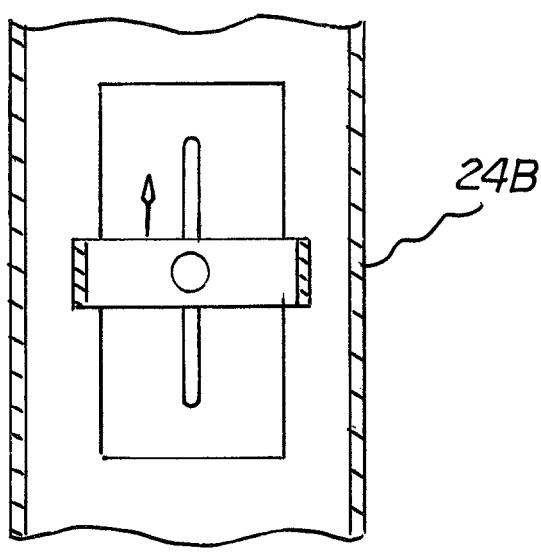
FIG. 7 is a cross sectional view taken along line 7-7 of FIG. 6.

With reference now to the drawings, and in particular to FIG. 1 thereof, the preferred embodiment of the new and improved modular surveillance tower system embodying the principles and concepts of the present invention and generally designated by the reference numeral 10 will be described.

The present invention, the modular surveillance tower system 10 is comprised of a plurality of components. In their broadest context such include a base, a plurality of modules, a plurality of digital components, a digital device, and a processor. Such components are individually configured and correlated with respect to each other so as to attain the desired objective.

In the preferred embodiment of the modular surveillance tower system, designated by the reference numeral 10, first provided is a base 16 in a tubular configuration. The base has an upper end 18 and a lower end 20. A support plate 22 is provided at the lower end of the base to allow the system to be freestanding on a recipient surface at a site 12 to be monitored. As an alternative to the system being freestanding, the base can be mounted on a recipient surface such as a wall. The upper end is at an elevation sufficient to allow monitoring of the site. The base is hollow and has a circular cross sectional configuration with a base diameter. The base has a base height between the upper end and the lower end. The base height is several times greater than the base diameter.

Next provided is a plurality of modules 24A, 24B, 24C, 24D. Each module is similarly configured in a tubular configuration. Each module has an upper end 28 and a lower end 30. Each module is hollow and has a circular cross sectional configuration with a module diameter equal to the base diameter. Each module has a module height between the upper end and the lower end. The module height is greater than the module diameter. The lower end of each module has a cylindrical projection 32 to facilitate removable coupling to the base or another module there beneath. The cylindrical projection has a diameter smaller than the module and base diameter.

The plurality of modules includes a lowermost module 24A removably supported on the upper end of the base. A hub 36 is positioned within the lowermost module. The hub is adapted to receive digital data, manipulate received digital data, and transmit manipulated digital data.

The plurality of modules also includes a lower module 24B removably supported on the upper end of the lowermost module. A first window 48 is positioned in the lower module. A first camera 50 is elevationally adjustable within the lower module adjacent to the first window. The first camera is adapted to monitor a first half of the site and generate first images. The first camera is adapted to transmit digital data to the hub representative of the first images.

The plurality of modules also includes an upper module 24C removably supported on the upper end of the lower module. A second window 54 is positioned in the upper module. The second window is located 180 degrees rotated from the first window. A second camera 56 is elevationally adjustable within the upper module adjacent to the second window. The second camera is adapted to monitor a second half of the site and generate second images. The second camera is adapted to transmit digital data to the hub representative of the second images.

The plurality of modules also includes an uppermost module 24D removably supported on the upper end of the upper module. A third window 60 is positioned in the uppermost module. A fourth window 62 is positioned in the uppermost module. The fourth window is located 180 degrees rotated from the third window. A first infrared lighting fixture 64 is positioned within the uppermost module adjacent to the third window. A second infrared lighting fixture 66 is positioned within the uppermost module adjacent to the fourth window.

A lid 70 is next provided. The lid is positioned on the upper end of the uppermost module. The lid, the base, the first module, the second module, the third module, and the fourth module are fabricated of a rigid material and constitute a tower 72.

The tower is thus a stacking system formed of the stacked modules operatively coupled one above the other. The operative coupling of the stacked modules with their tubular configurations allows for rotation of the modules with respect to each other about a vertical central axis. Greater adjustment capabilities are thus provided.

Next provided is a transceiver 76 in the base. The transceiver is adapted to transmit and receive digital signals to and from the first camera, the second camera, the first lighting fixture, and the second lighting fixture.

The use of tubular modules coupled together in a repositionable stack allows for electrical wiring and cables to be positioned and re-positioned between the various electrical components within the system including the cameras, lighting fixtures, hub, and transceiver.

A digital device 78, 80 adapted to control the system is next provided. The digital device is located remote from the tower. The digital device is selected from the class consisting of laptops 78 and smart phones 80.

Next, a processor 84 is provided. The processor is operatively coupled between the digital device and the tower for communicating there between.

Figure 8:
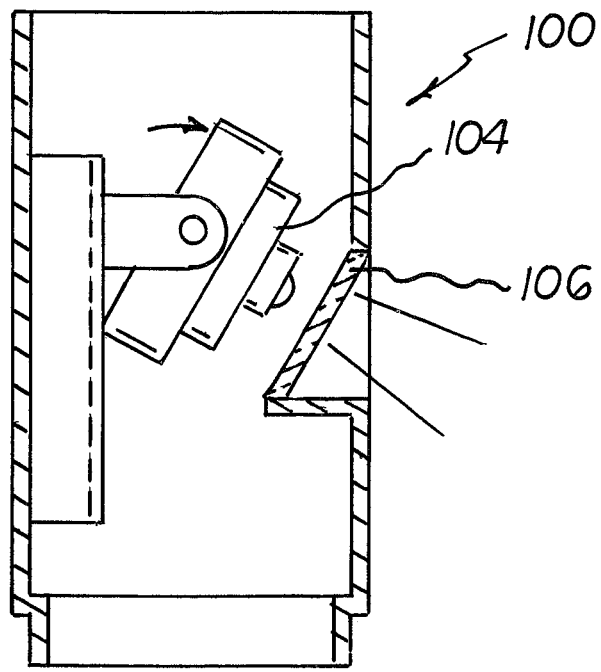
FIG. 8 is a cross-sectional view similar to FIG. 6 but illustrating the use of an angled lens to facilitate downward viewing.
Figure 9:
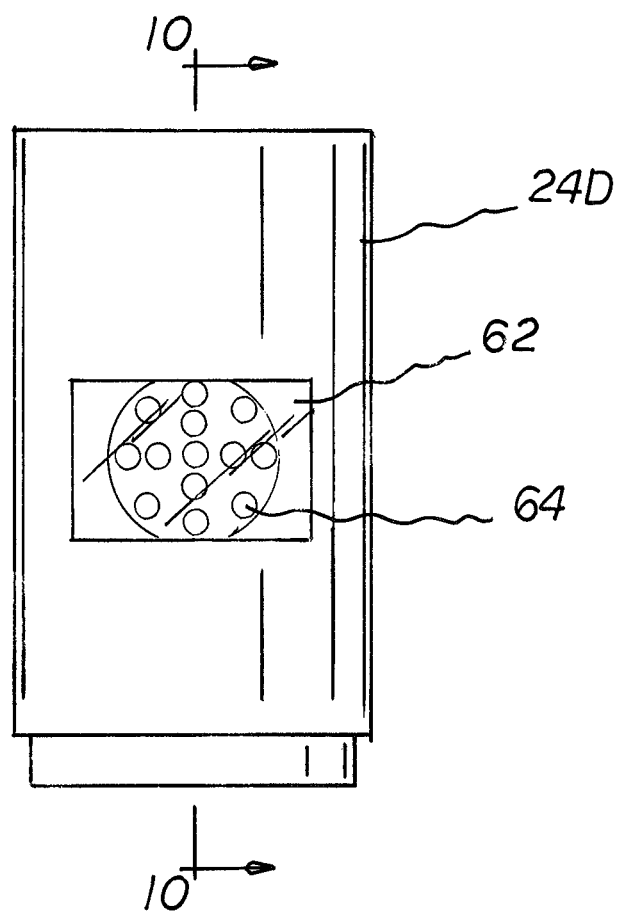
FIG. 9 is a side elevational view taken along line 9-9 of FIG. 4.
Figure 10:
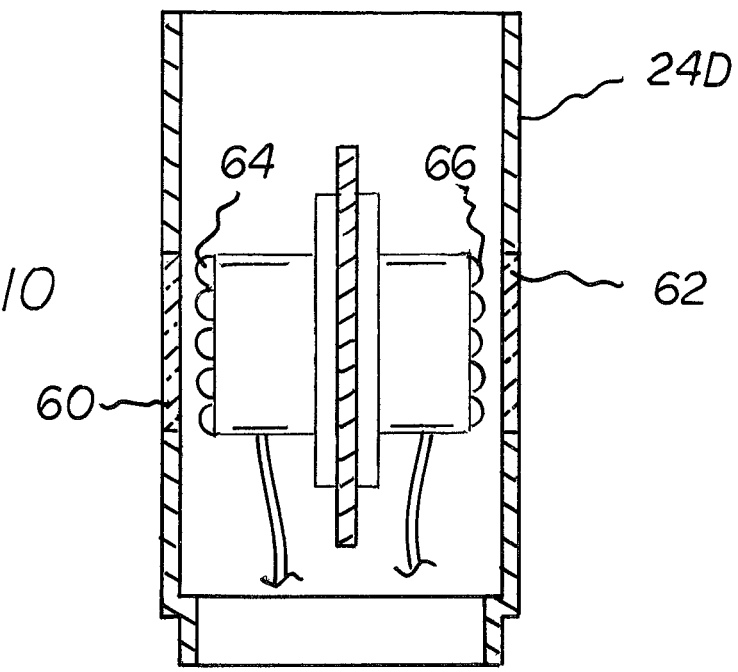
FIG. 10 is a cross sectional view taken along line 10-10 of FIG. 9.
Figure 11:
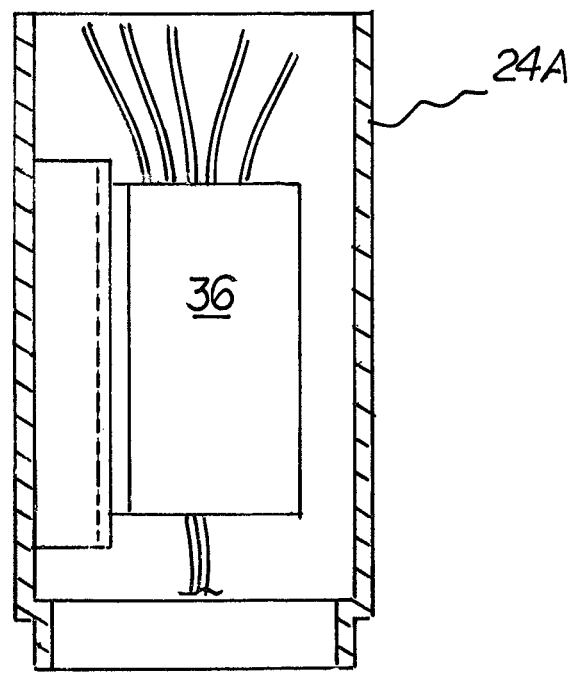
FIG. 11 is a cross sectional view taken along line 11-11 of FIG. 4.

In an alternate embodiment of the system 100, the plurality of modules includes a module with a camera 104 adjustable angularly and with a lens 106 angularly oriented. Note FIG. 8.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A modular surveillance tower system (10) for monitoring a site (12) and for modifying the system as a function of changing conditions, the system comprising, in combination:
   a base (16) in a tubular configuration and having an upper end (18) and a lower end (20), the lower end being positioned on a recipient surface at the site to be monitored, the upper end being at an elevation sufficient to allow monitoring of the site, the base being hollow and having a circular cross sectional configuration with a base diameter, the base having a base height between the upper end and the lower end, the base height being several times greater than the base diameter; a support plate (22) at the lower end of the base, to allow the system to be freestanding;
   a plurality of modules (24A) (24B) (24C) (240), each module being similarly configured in a tubular configuration, each module having an upper end (28) and a lower end (30), each module being hollow and having a circular cross sectional configuration, with a module diameter equal to the base diameter, each module having a module height between the upper end and the lower end, the module height being greater than the module diameter; a cylindrical projection (32) on the lower end of each module to facilitate removable coupling to the base or another one of the plurality of modules there beneath, the diameter of the cylindrical projection being smaller than the module and base diameter;
   the plurality of modules including a lowermost module (24A) removably supported on the upper end of the base, a hub (36) positioned within the lowermost module, the hub adapted to receive digital data, manipulate received digital data, and transmit manipulated digital data;
   the plurality of modules including a lower module (24B) removably supported on the upper end of the lowermost module, a first window (48) positioned in the lower module, a first camera (50) elevationally adjustable within the lower module adjacent to the first window, the first camera adapted to monitor a first half of the site and generate first images, the first camera adapted to transmit digital data to the hub representative of the first images;
   the plurality of modules including an upper module (24C) removably supported on the upper end of the lower module, a second window (54) positioned in the upper module, the second window being located 180 degrees rotated from the first window, a second camera (56) elevationally adjustable within the upper module adjacent to the second window, the second camera adapted to monitor a second half of the site and generate second images, the second camera adapted to transmit digital data to the hub representative of the second images; the plurality of modules including an uppermost module (240) removably supported on the upper end of the upper module, a third window (60) positioned in the uppermost module, a fourth window (62) positioned in the uppermost module, the fourth window being located 180 degrees rotated from the third window, a first infrared lighting fixture (64) positioned within the uppermost module adjacent to the third window, a second infrared lighting fixture (66) positioned within the uppermost module adjacent to the fourth window; a lid (70) positioned on the upper end of the uppermost module, the lid and the base and the first module and the second module and the third module and the fourth module being fabricated of a rigid material and constituting a tower (72);
   a transceiver (76) in the base adapted to transmit and receive digital signals to and from the first camera and the second camera and the first lighting fixture and the second lighting fixture; a digital device (78)(80) located remote from the tower adapted to control the system, the digital device selected from the class consisting of lap tops (78) and smart phones (80); and a processor (84) operatively coupled between the digital device and the tower for communicating there between.

* * * * *